(12) United States Patent
Farris et al.

(10) Patent No.: US 6,438,218 B1
(45) Date of Patent: Aug. 20, 2002

(54) INTERNET TELEPHONE SERVICE

(76) Inventors: Robert D. Farris, 114 Gold Thorn Way, Sterling, VA (US) 20164; Dale L. Bartholomew, 312 Orchard Ct., NW., Vienna, VA (US) 22180; Stephen J. Flaherty, 13513 Lord Baltimore Pl., Upper Marlboro, MD (US) 20772

( * ) Notice: Subject to any disclaimer, the term of this patent is extended or adjusted under 35 U.S.C. 154(b) by 935 days.

(21) Appl. No.: 08/634,543

(22) Filed: Apr. 18, 1996

(51) Int. Cl.[7] ............................. H04M 1/64; H04M 3/00
(52) U.S. Cl. ................ 379/88.17; 379/67.1; 379/88.13; 379/88.19; 379/265.09
(58) Field of Search ................................. 370/352, 353, 370/380, 389, 392, 396, 401, 404, 427, 435, 450, 465, 485; 379/90.1, 93.01, 93.05, 93.09, 100.15, 100.16, 67.1, 88.13, 88.17, 88.18, 88.19, 88.2, 88.21, 88.03, 265.09, 900, 904

(56) References Cited

U.S. PATENT DOCUMENTS

| | | | |
|---|---|---|---|
| 4,310,727 A | 1/1982 | Lawser | 379/207 |
| 4,371,751 A | 2/1983 | Matthews et al. | 379/89 |
| 4,585,906 A | 4/1986 | Matthews et al. | 379/88 |
| 4,602,129 A | 7/1986 | Matthews et al. | 379/88 |
| 4,609,778 A | 9/1986 | Franklin et al. | 379/240 |
| 4,625,081 A | 11/1986 | Lotito et al. | 379/88 |
| 4,652,700 A | 3/1987 | Matthews et al. | 379/89 |
| 4,672,700 A | 6/1987 | Poncy | 378/54 |
| 4,766,604 A | 8/1988 | Axberg | 379/67 |
| 4,771,425 A * | 9/1988 | Baran et al. | 370/85 |
| 4,790,003 A | 12/1988 | Kepley | 379/67 |
| 4,872,160 A | 10/1989 | Hemmady et al. | 370/353 |
| 4,918,722 A | 4/1990 | Duehran et al. | 379/100.11 |
| 4,922,348 A | 5/1990 | Gillon et al. | 358/407 |
| 4,958,341 A | 9/1990 | Hemmady et al. | 370/352 |
| 4,969,184 A | 11/1990 | Gordon et al. | 379/100.13 |
| 5,008,906 A | 4/1991 | Reichwein | 379/211 |
| 5,008,926 A | 4/1991 | Misholi | 379/89 |
| 5,012,511 A | 4/1991 | Hanle et al. | 379/211 |
| 5,018,191 A | 5/1991 | Catron et al. | 379/100 |
| 5,029,199 A | 7/1991 | Jones et al. | 379/89 |
| 5,029,200 A | 7/1991 | Haas | 379/89 |
| 5,034,975 A | 7/1991 | Grimes | 379/67 |
| 5,134,647 A | 7/1992 | Pugh et al. | 379/88 |

(List continued on next page.)

OTHER PUBLICATIONS

Audio Messaging Interchange Specification (AMIS)—Analog Protocol, Version 1, Issue 2, Feb. 1992.

Common Channel Signaling System No. 7 for ISDN and Intelligent Networks, Jabbari, B. 8078 Proceedings IEEE 79 (1991) No. 2.

Primary Examiner—Allan Hoosain
(74) Attorney, Agent, or Firm—Rader, Fishman & Grauer PLLC

(57) ABSTRACT

A public switched telephone network utilizing program controlled switching systems controlled by common channel interoffice signaling (CCIS) and preferably an advanced intelligent network (AIN) CCIS network is arranged in an architecture to provide a methodology for facilitating telephone use of the Internet by customers on an impromptu basis. Provision is made to permit a caller to set-up and carry out a telephone call over the Internet from telephone station to telephone station without access to computer equipment and without the necessity of maintaining a subscription to any Internet service. Billing may be accomplished on a per call basis. The calls may be inter and intra LATA, region or state and may be nationwide. Usage is made of CCIS signaling to set up the call and establish the necessary Internet connections and addressing. Calls may be made from telephone station to telephone station, from voice capable computer to voice capable computer, or from telephone to computer or computer to telephone.

22 Claims, 10 Drawing Sheets

U.S. PATENT DOCUMENTS

| | | | |
|---|---|---|---|
| 5,163,080 A | 11/1992 | Amoroso | 379/33 |
| 5,193,110 A | 3/1993 | Jones et al. | 379/93.14 |
| 5,195,128 A | 3/1993 | Knitl | 379/67 |
| 5,199,062 A | 3/1993 | Von Meister | 379/67 |
| 5,200,993 A | 4/1993 | Wheeler et al. | 379/93.02 |
| 5,237,604 A | 8/1993 | Ryan | 379/246 |
| 5,247,571 A | 9/1993 | Kay et al. | 379/207 |
| 5,263,080 A | 11/1993 | Jones et al. | 379/88 |
| 5,274,696 A | 12/1993 | Perelman | 379/89 |
| 5,289,468 A | 2/1994 | Yoshida | 370/401 |
| 5,309,437 A | 5/1994 | Perlman | 370/401 |
| 5,327,486 A * | 7/1994 | Wolff et al. | 379/96 |
| 5,333,266 A | 7/1994 | Boaz | 395/200.36 |
| 5,341,374 A | 8/1994 | Lewen et al. | 370/450 |
| 5,353,331 A | 10/1994 | Emery et al. | 455/461 |
| 5,367,566 A | 11/1994 | Moe et al. | 379/203 |
| 5,375,068 A | 12/1994 | Palmer et al. | 395/200.34 |
| 5,375,159 A | 12/1994 | Williams | 379/23 |
| 5,377,186 A | 12/1994 | Wegner et al. | 370/220 |
| 5,381,465 A | 1/1995 | Carter et al. | 379/67 |
| 5,386,467 A | 1/1995 | Ahmad | 379/220 |
| 5,400,393 A | 3/1995 | Knuth | 379/88 |
| 5,410,754 A | 4/1995 | Koltzbach et al. | 370/466 |
| 5,420,916 A | 5/1995 | Sekiguchi | 379/230 |
| 5,434,913 A | 7/1995 | Tung et al. | 379/202 |
| 5,436,957 A | 7/1995 | McConnell | 379/88 |
| 5,442,690 A | 8/1995 | Nazif et al. | 379/207 |
| 5,473,677 A | 12/1995 | D'Amato et al. | 379/112 |
| 5,475,737 A | 12/1995 | Garner et al. | 379/67 |
| 5,490,247 A | 2/1996 | Tung et al. | 345/501 |
| 5,493,568 A | 2/1996 | Sampat et al. | 370/261 |
| 5,526,353 A * | 6/1996 | Henley et al. | 370/60.1 |
| 5,583,920 A * | 12/1996 | Wheeler, Jr. | 379/88 |
| 5,608,446 A * | 3/1997 | Carr et al. | 348/6 |
| 5,608,786 A * | 3/1997 | Gordon | 379/100 |

* cited by examiner

INTERNET TELEPHONE SERVICE

RELATED APPLICATIONS

This application is related to application Ser. No. 08/598,767, Analog Terminal Internet Access, filed Feb. 2, 1996, which is a continuation-in-part of applications Ser. No. 08/353,281, filed Dec. 5, 1994, Ser. No. 08/371,906, filed Jan. 12, 1995, Ser. No. 08/539,952, filed Oct. 6, 1995, and Ser. No. 08/557,749, filed Nov. 13, 1995, and to application Ser. No. 08/634,544, Universal Access Multimedia Data Network, filed Apr. 18, 1996, which applications are assigned to the assignee of the instant application. The specifications of those applications are incorporated herein by reference in their entirety.

TECHNICAL FIELD

The present invention relates to methods and system structures for providing public and private telephone service over the Internet and more particularly relates to providing such services through the public telecommunications system including over existing copper telephone lines.

BACKGROUND

Attention recently has been directed to implementing voice telephone service over the worldwide network now commonly known as the Internet. The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust, in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries.

Referring to FIG. 1 there is shown a simplified diagram of the Internet. Generally speaking the Internet consists of Autonomous Systems (AS) which may be owned and operated by Internet Service Providers (ISPs) such as PSI, UUNET, MCI, SPRINT, etc. Three such AS/ISPs are shown in FIG. 1 at 10, 12 and 14. The Autonomous Systems (ASs) are linked by Inter-AS Connections 11, 13 and 15. Information Providers (IPs) 16 and 18, such as America Online (AOL) and Compuserve, are connected to the Internet via high speed lines 20 and 22, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP using UUNET as an ISP. Other information providers, such as universities, are indicated in exemplary fashion at 24 and are connected to the AS/ISPs via the same type connections here illustrated as T1 lines 26. Corporate Local Area Networks (LANs), such as those illustrated in 28 and 30, are connected through routers 32 and 34 and links shown as T1 lines 36 and 38. Laptop computers 40 and 42 are representative of computers connected to the Internet via the public switched telephone network (PSTN) are shown connected to the AS/ISPs via dial up links 44 and 46.

The Information Providers (IPs) constitute the end systems which collect and market the information through their own servers. Access providers are companies such as UUNET, PSI, MCI and SPRINT which transport the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

The Federal Networking Council (FNC) on Oct. 24, 1995 unanimously passed a resolution defining the term Internet. The defining portion of that resolution is as follows:

"'Internet' refers to the global information system that—
(i) is logically linked together by a globally unique address space based on the Internet Protocol (IP) or its subsequent extensions/follow-ons'
(ii) is able to support communications using the Transmission Control Protocol/Internet Protocol (TCP/IP) suite or its subsequent extensions/follow-ons, and/or other IPO-compatible protocols; and
(iii) provides, uses or makes accessible, either publicly or privately, high level services layered on the communications and related infrastructure described herein."

Applicants use the term Internet herein in the sense of the FNC definition. The FNC Resolution is incorporated by reference herein in its entirety.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface.

The system incorporates means for packet switching and for using the internet protocol (IP).

DISCLOSURE OF THE INVENTION

Objects of the Invention

It is an object of the present invention to provide telephone service via the Internet to users of the public telecommunications network either with or without access to a computer and with or without separate telephone user access to the Internet.

It is another object of the invention to provide the general public with an economical and convenient telephone service via the Internet without requiring the possession of computing equipment or familiarity with the Internet or its methodology on the part of the user.

It is yet another object of the invention to provide the public with impulse access to the Internet for voice communications without requiring maintenance of a subscription to an Internet access service.

SUMMARY OF THE INVENTION

A public switched telephone network utilizing program controlled switching systems controlled by common channel interoffice signaling (CCIS) and preferably an advanced intelligent network (AIN) CCIS network is arranged in an architecture to provide a methodology for facilitating telephone use of the Internet by customers on an impromptu basis. Provision is made to permit a caller to set-up and carry out a telephone call over the Internet from telephone station to telephone station without access to computer equipment and without the necessity of maintaining a subscription to any Internet service. Billing may be accomplished on a per call basis. The calls may be inter and intra LATA, region or state and may be nationwide. Usage is made of CCIS signaling to set up the call and establish the necessary Internet connections and addressing. Calls may be made from telephone station to telephone station, from voice capable computer to voice capable computer, or from telephone to computer or computer to telephone.

BEST MODE FOR CARRYING OUT THE INVENTION

Modern Public Switched Telephone Networks (PSTNs) are generally implemented using an Advanced Intelligent Network (AIN) type architecture. One example of such an AIN system in a typical PSTN appears in simplified block diagram form in FIG. 2.

In this example central office switches or CO's may be located throughout a state. Local telephone lines connect individual telephone stations in each geographic area to the closest central office. Each central office connects via trunk circuits to one or more of the other CO's, and each CO has a Common Channel Interoffice Signaling (CCIS) data link to a Signaling Transfer Point (STP). The trunk circuits carry large numbers of telephone calls between the central offices. CCIS data communication is provided via links to signaling transfer points (STPs).

Figure 2:
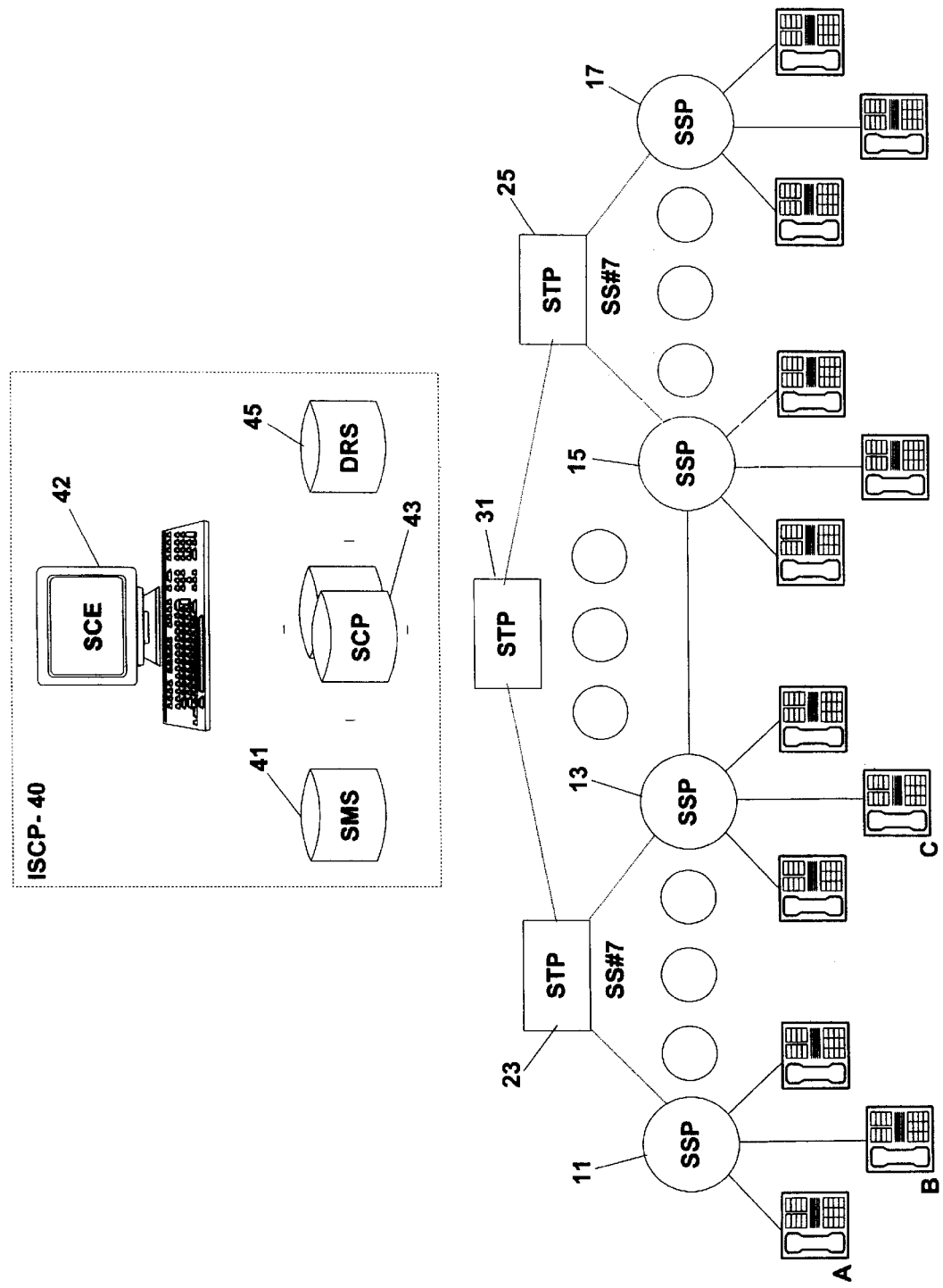
FIG. 2 is a simplified block diagram of a Public Switched Telephone Network (PSTN) having a Common Channel Interoffice Signaling (CCIS) system in the form of an Advanced Intelligent Network (AIN) system.

An AIN PSTN may be implemented with one or more Integrated Service Control Points (ISCPs) per state, as in the FIG. 2 implementation, to avoid overloading existing CCIS data links. Alternatively, the ISCP could be implemented on a LATA by LATA basis or on a regional operating company basis, i.e., one data base for the entire geographic area serviced by one of the Regional Bell Operating Companies. In fact, if federal regulations permitted, the data base service could be nationwide.

Referring to FIG. 2, each of the central offices are labeled as an "SSP." The Service Switching Points, referred to as SSPs, are appropriately equipped programmable switches present in the telephone network, which recognize AIN type calls, launch queries to the ISCP and receive commands and data from the ISCP to further process the AIN calls.

SSPs can be programmed to recognize a number of different triggers as an indication that a call is an AIN call. The trigger can relate to the terminating station or to the identification of the telephone line from which a call or other request for service originates, or to the action to be performed by the SSP. As an example, for providing Area Wide Centrex, a number of lines are designated as members of a business group serviced by the Area Wide Centrex. The SSPs then trigger AIN type servicing based on origination of the call or service request from a line designated as a member of one of the business groups subscribing to Area Wide Centrex. Further explanation of this operation will be found in U.S. Pat. No. 5,247,571, issued Sep. 21, 1993, which is incorporated herein by reference.

As shown in FIG. 2, all of the central offices 11, 13, 15 and 17 are equipped and programmed to serve as SSPs. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSPs. The illustrated embodiment is perhaps an ideal implementation in making each central office an SSP. Other implementations provide the SSP functionality only at selected points in the network, and end offices without such functionality forward calls to one of the SSPs.

The implementation of FIG. 2 includes a number of the SSP capable central office switches, such as the SSPs shown at 11, 13, 15, and 17. The SSP type central offices are each at a different location and distributed throughout the area, region or country served by the system. The SSPs 11 and 13 connect to a first local area STP 23, and the SSPs 15 and 17 connect to a second local area STP 25. The connections to the STPs are for signaling purposes. As indicated by the black dots below STPs 23 and 25, each local area STP can connect to a large number of the SSPs. In FIG. 2 the central offices or SSPs are interconnected to each other by trunk circuits for carrying telephone services.

The local area STPs 23 and 25, and any number of other such local area STPs shown as black dots between STPs 23 and 25, communicate with a state or regional STP 31. The state or regional STP 31 in turn provides communications with the ISCP 40. The STP hierarchy can be expanded or contracted to as many levels as needed to serve any size area covered by the system. The links 23 and 25 between the central offices and the local area STPs are dedicated CCIS links, typically SS#7 type interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. An initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 2, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE for programming the data base in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two central offices.

Figure 3:
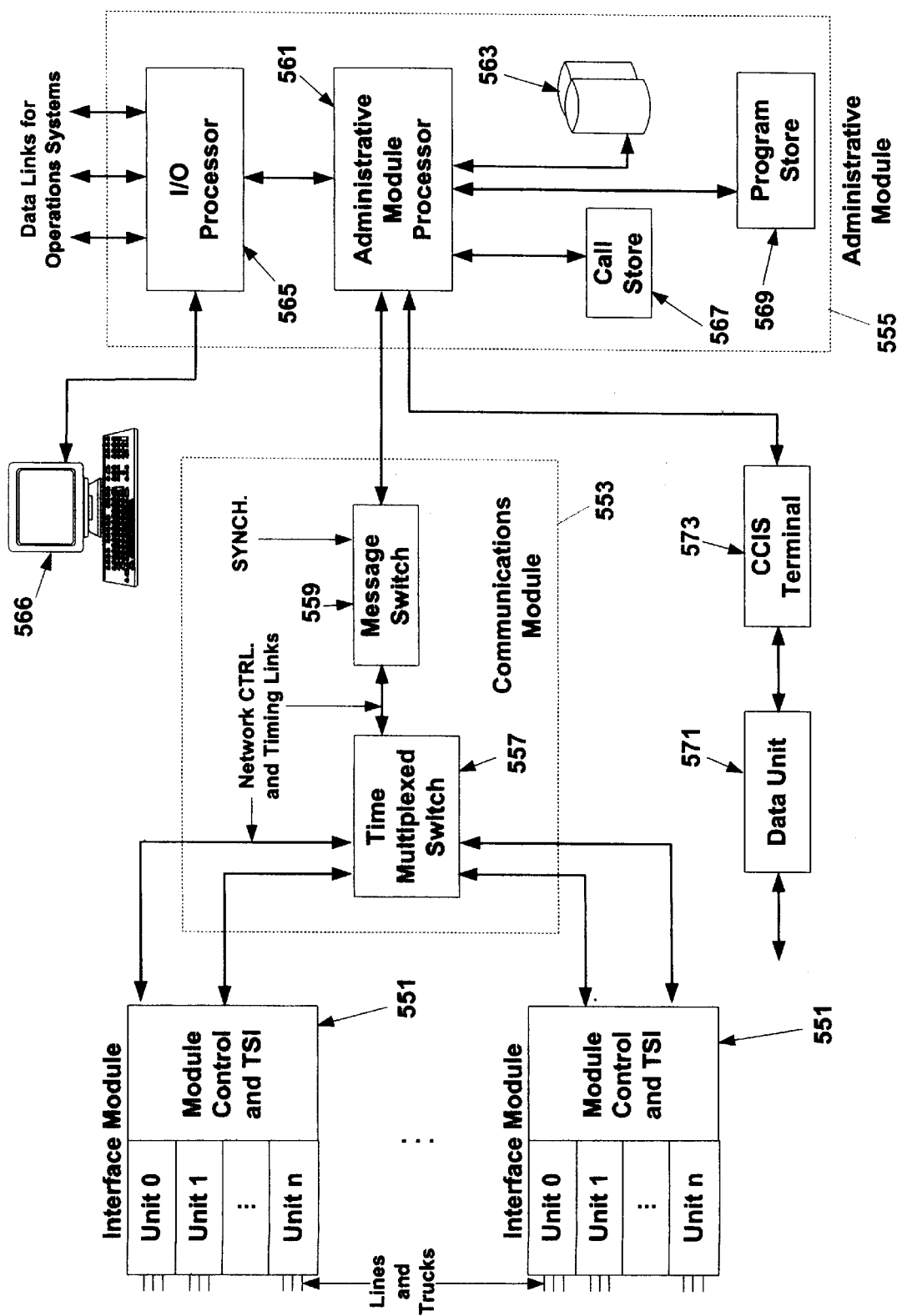
FIG. 3 is a simplified block diagram of an electronic program controlled switch which may be used as any one of the SSP type central offices in the system of FIG. 2.

FIG. 3 is a simplified block diagram of an electronic program controlled switch which may be used as any one of the SSP type central offices in the system of FIG. 2. As illustrated, the central office switch includes a number of different types of modules. In particular, the illustrated switch includes interface modules 551 (only two of which are shown), a communications module 553 and an administrative module 555.

The interface modules 551 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 551 also includes a digital service unit (not shown) which is used to generate call progress tones.

Each interface module 551 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 557 and thence to another interface module (intermodule call connection).

The communication module 553 includes the time multiplexed switch 557 and a message switch 559. The time multiplexed switch 557 provides time division transfer of digital voice data packets between voice channels of the interface modules 551 and transfers data messages between the interface modules. The message switch 559 interfaces the administrative module 555 to the time multiplexed switch 557, so as to provide a route through the time multiplexed switch permitting two-way transfer of control related messages between the interface modules 551 and the administrative module 555. In addition, the message switch 559 terminates special data links, for example a link for receiving a synchronization carrier used to maintain digital synchronism.

The administrative module 555 includes an administrative module processor 561, which is a computer equipped with disc storage 563, for overall control of central office operations. The administrative module processor 561 communicates with the interface modules 551 through the communication module 555. The administrative module 555 also includes one or more input/output (I/O) processors 565 providing interfaces to terminal devices for technicians, such as shown at 566 in the drawing, and data links to operations systems for traffic, billing, maintenance data, etc. A CCIS terminal 573 and an associated data unit 571 provide a signaling link between the administrative module processor 561 and an SS7 network connection to an STP or the like (see FIG. 2), for facilitating call processing signal communications with other central offices and with the ISCP 540.

As illustrated in FIG. 3, the administrative module 555 also includes a call store 567 and a program store 569. Although shown as separate elements for convenience, these are typically implemented as memory elements within the computer serving as the administrative module processor 561. For each call in progress, the call store 567 stores translation information retrieved from disc storage 563 together with routing information and any temporary information needed for processing the call. The program store 569 stores program instructions which direct operations of the computer serving as the administrative module processor.

Figure 4:
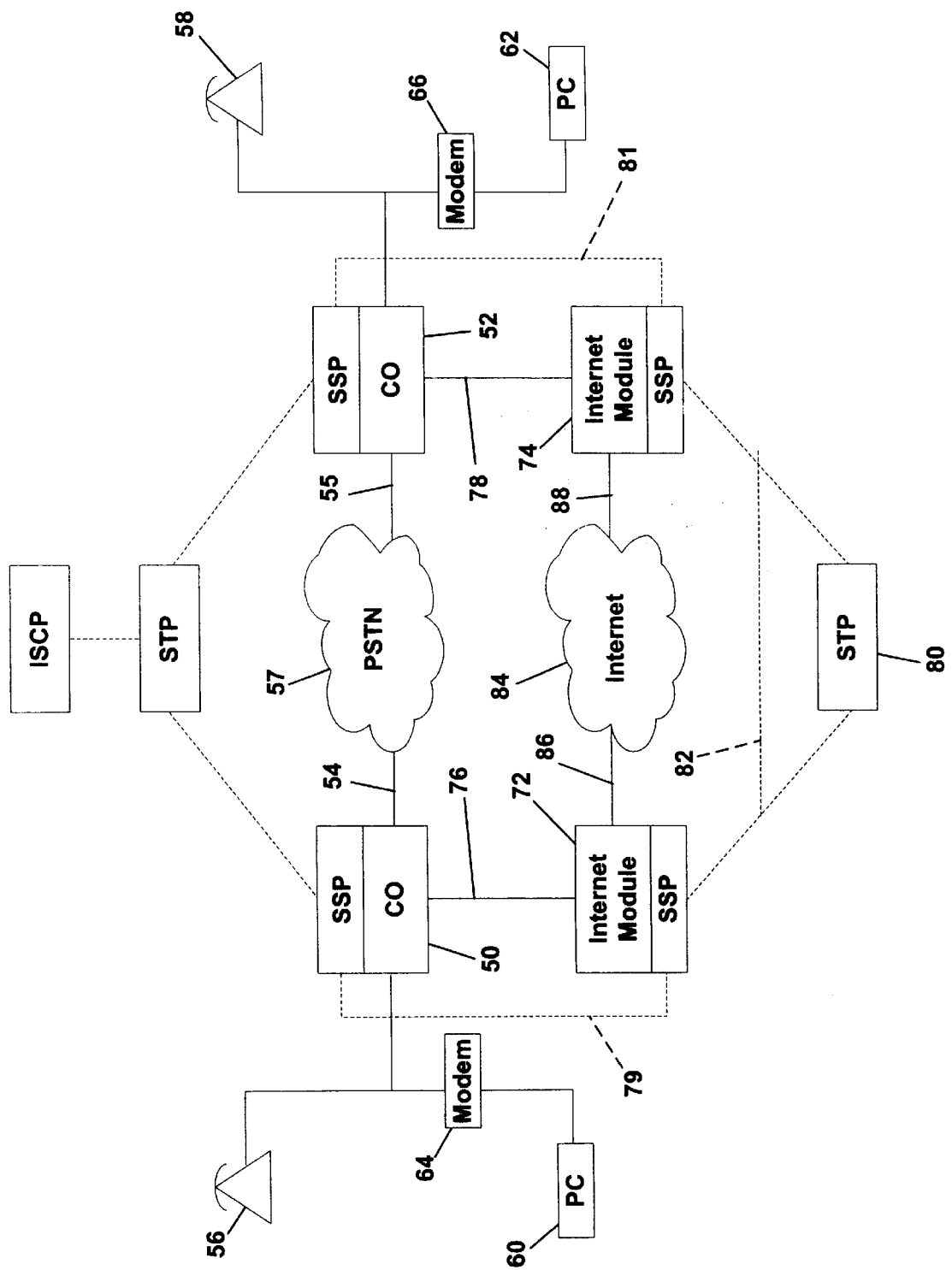
FIG. 4 shows the functional architecture of one embodiment of a system for providing public and private telephone service over the Internet through the public telecommunications system.

Referring to FIG. 4 there is shown a simplified block diagram of an AIN controlled PSTN, such as the type shown in more detail in FIG. 2, which includes architecture for implementing one preferred embodiment of the invention. Referring to that figure there are shown two SSP capable central offices 50 and 52 which may be located in the same or different states and regions. These central offices are connected by trunks indicated at 54 and 55 to the PSTN indicated by a cloud 57. Each central office is connected by local loops to subscribers customer premises equipment (CPE) such as telephone terminals 56 and 58. These may be basic instruments for providing Plain Old Telephone Service (POTS). The subscriber premises are also shown as having personal computers (PCs) 60 and 62 connected to the local loops via modems 64 and 66. The SSPs associated with the central offices 50 and 52 are connected by CCIS links to an STP which in turn may be connected to an ISCP. While the STP functionality is here shown as constituting a single STP it will be appreciated that this is for the purpose of simplicity only and that a hierarchy of STPs may be involved.

According to this embodiment of the invention each of the central offices 50 and 52 is provided with an Internet Module here indicated at 72 and 74 connected by T1 trunks 76 and 78. Alternatively the Internet Module hardware may be situated at the central office and associated with the switching system. The Internet Modules may be provided with SSP capabilities and connected into the CCIS network as indicated by the links to the illustrative STP 80. The SSPs serving the Internet Module are inter-connected with the central office SSPs and CCIS network as shown here by illustrative links 79 and 81. The Internet Modules may be linked for signaling purposes by conventional F links indicated at 82. The Internet Modules are connected to the Internet cloud by T1/T3 trunks 86 and 88.

Figure 1:
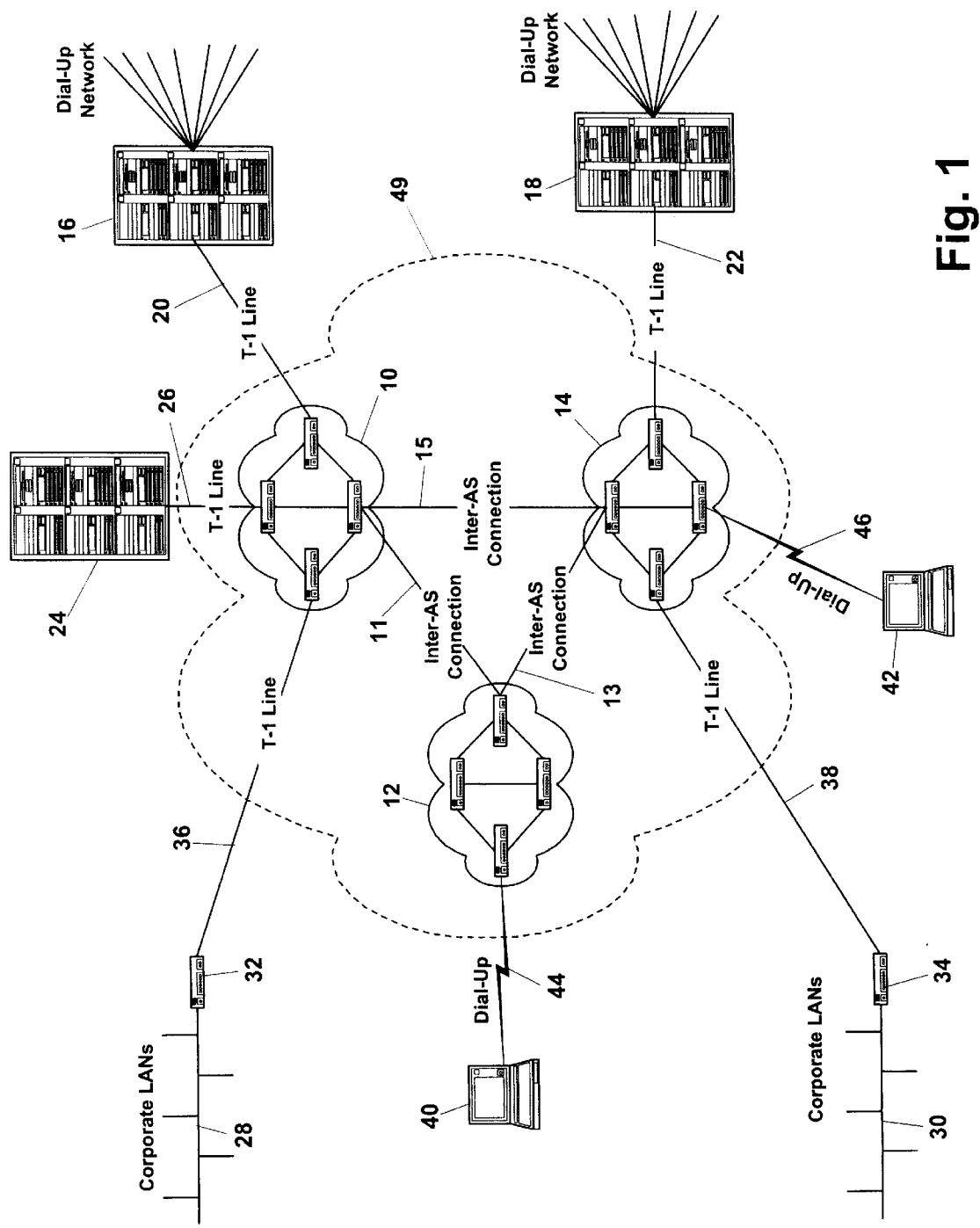
FIG. 1 is a simplified diagram of the Internet.
Figure 5:
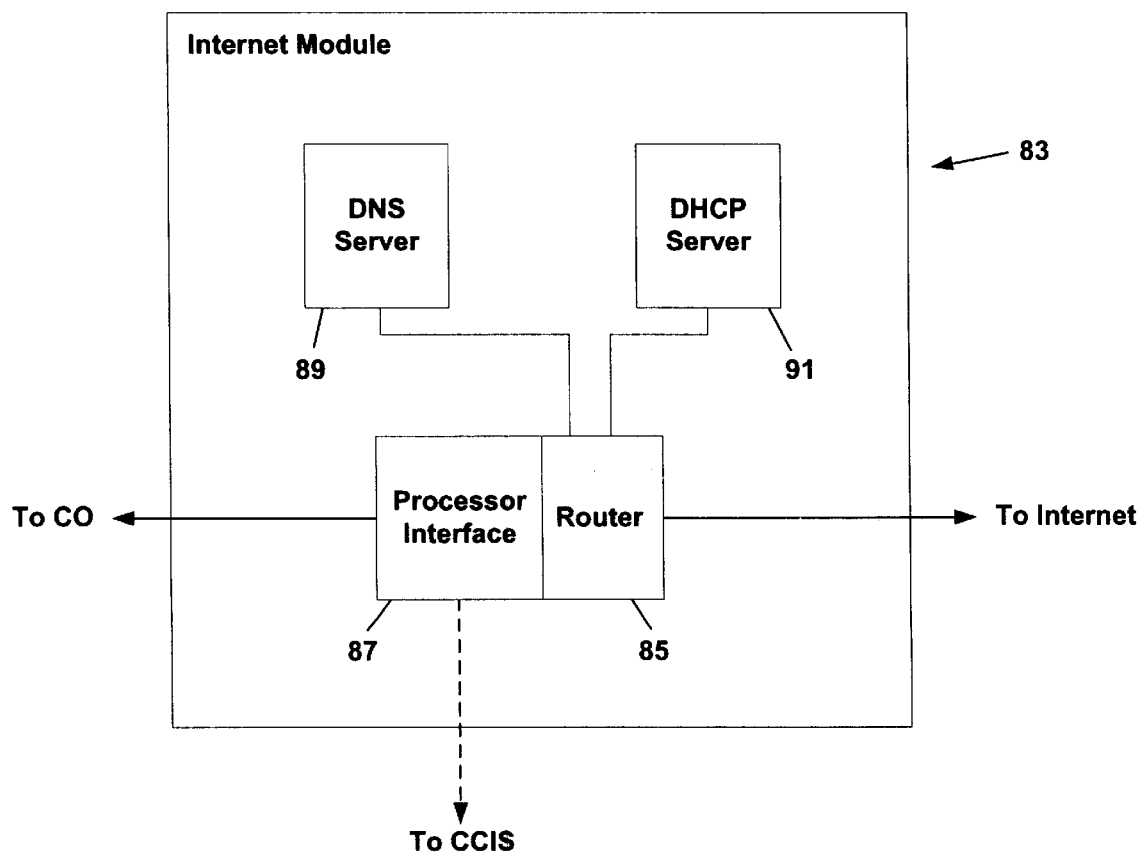
FIG. 5 shows in diagrammatic form the functional architecture of one embodiment of an Internet Module for use in the invention.

The functional architecture of one embodiment of an Internet Module for use in the invention is shown diagrammatically in FIG. 5. The Internet Module, generally indicated at 83, includes a router 85 of the type now generally used in Internet practice, such as shown in FIG. 1 and described in related application Ser. No. 08/634,544, referenced above. For performing some functions according to certain embodiments of the invention the router may be provided with an interface with processing capability as illustratively shown at 87. Connected to the router are a Domain Name Service (DNS) server 89 and a Dynamic Host Configuration Protocol (DHCP) server 91 of the type conventionally used by Internet Service Providers in existing Internet Service. The router interface is connected to the central office and to the CCIS network while the router is connected to the Internet.

Figure 6:
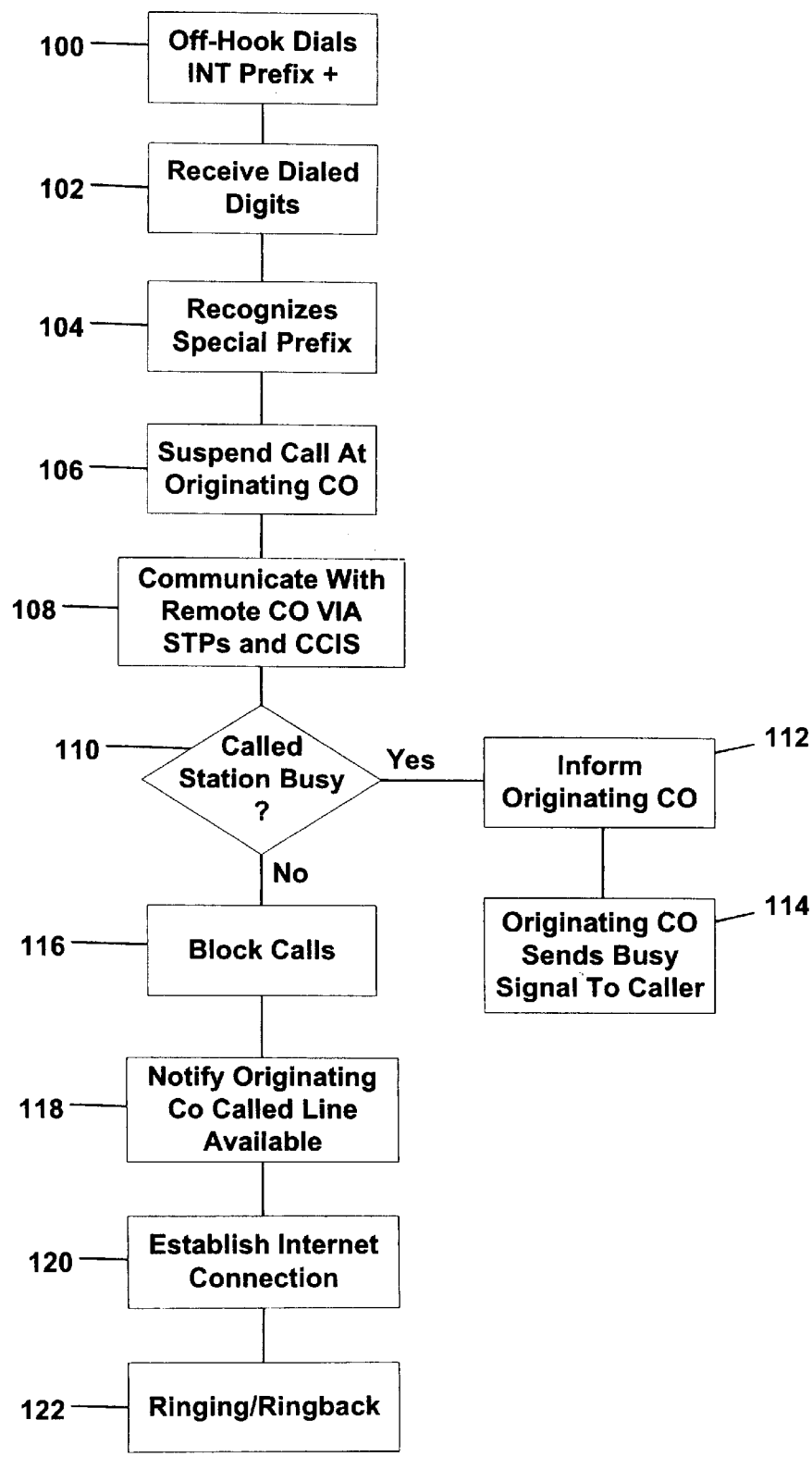
FIGS. 6 and 7 illustrate in simplified flow diagrams one mode of operation of the system of FIG. 4.
Figure 7:
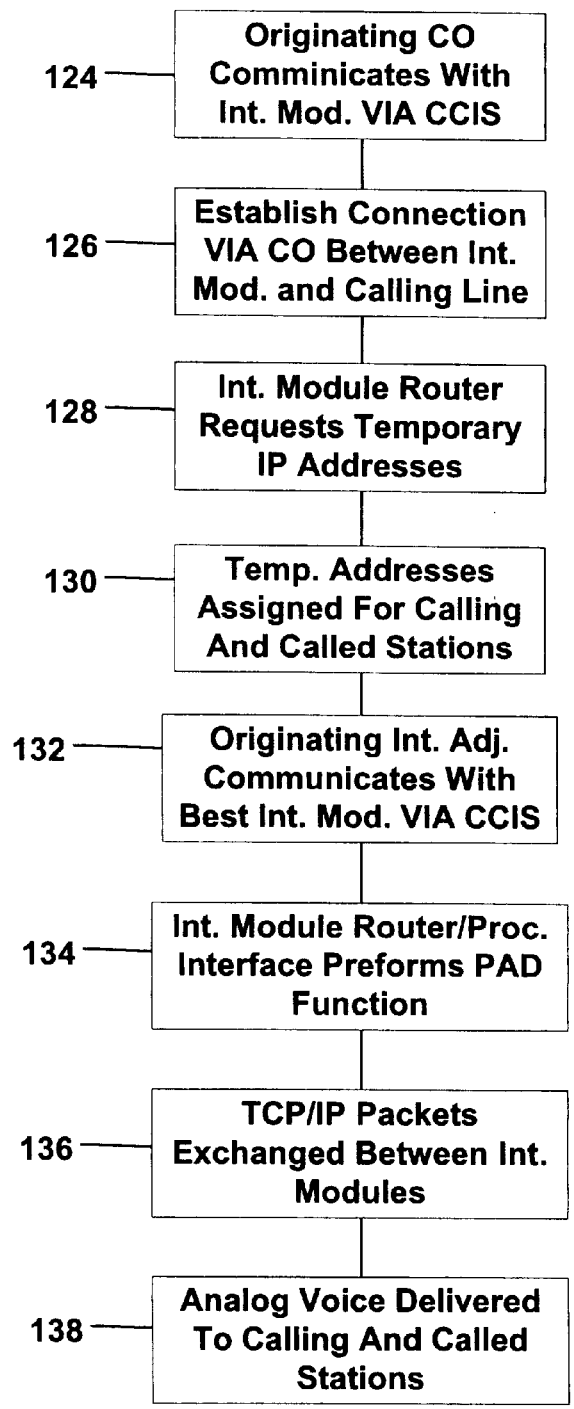

One mode of operation of the system of FIG. 4 is now described in relation to the simplified flow diagrams of FIGS. 6 and 7. According to this embodiment an Internet connection is used to link a calling to a called telephone without the necessity of either party possessing or using personal or office computer equipment. The subscriber in this example uses the POTS station at 56 to initiate an Internet call to a called party at the POTS station 58. The caller goes off-hook and dials *82. This prefix has been established by the Telco offering the service as a predesignated prefix with which the public may initiate an Internet telephone call. The dialing of the prefix *82 is followed by the dialing of the directory number of the called party at the station 58.

As is illustrated in the method shown in FIG. 5, the calling party goes off-hook and dials the prefix *82 at 100. At 102 the central office switching system responds to an off-hook and receives the dialed digits from the calling station. At 104 the central office switching system analyzes the received digits and determines from the prefix *82 that the call is an Internet call. Responsive to its programming it knows that the call must be completed through a remote central office and that further processing is necessary. At 106 the local or originating central office suspends the call and at 108 sends a CCIS query message through one or more of the STPs.

The query message goes to the central office to which the called station is connected. The receiving or destination central office receives the query and determines at 110 whether or not the called station at 58 is busy. If the called station is busy, the receiving central office so informs the originating central office at 112. At 114 the originating central office provides a busy signal to the calling station.

If the called station is not busy, the receiving central office busies out the called station line by blocking all calls at 116. The receiving or destination central office then informs the originating central office that the called line is available and waiting at 118 and that the processor in the Internet Module associated with the central office 52 is available.

An Internet virtual connection is then established between the calling and called stations at 120 as presently will be described in detail. The receiving or destination central office provides a ringing signal to the called station and the originating central office sends ringback tone back through the local loop to the calling station at 122. When the called station goes off-hook and the Internet virtual connection is completed the conversation via the Internet can commence.

Referring next to the flow diagram in FIG. 7 one embodiment of the set up of the Internet connection is now described. When the originating central office receives from the destination central office the CCIS signal announcing that the called station is available and waiting, the originating central office may send a CCIS message to the Internet Module 72 and the processor interface 87 to the router 85. This message delivers the directory numbers of the calling station and the called station and requests establishment of an Internet connection (or virtual connection) between the two.

The processor interface and router may then react to receipt of that CCIS signal and request the temporary assignment of Internet addresses for the processors associated with the respective central offices. Upon completion of the assignment of the addresses the processor 87 may send a CCIS signal to the originating central office advising of that fact. This CCIS or SS7 communication between the originating central office and the originating Internet Module is indicated at 124. When the originating central office receives the message that the addresses have been assigned the switching system connects the originating local loop to the Internet Module 72. This connection is indicated at 126.

As an alternative to this connection procedure the originating central office may establish the line or trunk connection to the Internet Module 72 immediately upon receipt of the CCIS signal indicating that the called station is available and waiting. In this alternative the originating central office then sends the directory numbers of the calling and called stations along with a request to establish an Internet connection or virtual connection between the two stations for a voice communication session either via the line or trunk connection to the Internet Module 72 or via the CCIS link to the Internet Module.

Following either of the foregoing embodiments of the initial connection steps, the Internet Module router 85 in the Internet Module 72 sends a request for the assignment of temporary IP addresses for the two directory numbers to the DHCP server 91 as indicated at 128. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned at 130. At 132 originating Internet Module 72 triggers a CCIS message to the destination Internet Module 74 which includes the temporary IP address assigned to the called directory number and associated processor.

As an alternative to the obtaining of an Internet address for the processor associated with the receiving central office at the originating central office switching system and its associated Internet Module the address may be obtained at the receiving central office switching system and its associated Internet Module and communicated to the originating central office switching system via the common channel signaling link.

As the conversation commences the originating Internet Module 72 is receiving from the originating central office 50 over the trunk connection digitized speech in DS0 format. The Internet Module implements the function of a packet assembler and disassembler or PAD and assembles packets in TCP/IP format. This is indicated at 134. The packets bear the source and destination IP addresses and the digitized speech payload. The packets are dispatched from the originating router 85 onto the Internet and are delivered to the destination router and Internet Module 74. The receiving router and associated processor have the directory number of the called party and the matching IP address which were obtained via CCIS signaling from the originating router as indicated at step 132 described hereinabove. The destination router and its processor interface perform the inverse function of the originating router and make the necessary translation of the TCP/IP packets to DS0 format which is delivered over the destination trunk to the destination central office. The switching system in that office converts the DS0 to analog and delivers the analog speech signal over the destination local loop to the destination telephone station 58. The responsive speech signal from the destination telephone station is processed in inverse fashion by the destination central office switching system and destination Internet Module and delivered to the Internet in TCP/IP format. The originating Internet Module and central office switching system also act in inverse fashion to deliver to the originating telephone station an analog voice signal. The packet exchange is indicated in FIG. 7 at 136. The two way transfer of voice signals is indicated at 138.

Upon the establishment of the line/trunk connection to the Internet Module the originating central office may send billing information to the switch journal which indicates that an Internet call has been initiated and that may be recorded in the conventional manner. The DHCP server may also incorporate a billing capability which may be utilized as an alternative to journal billing if desired. Thus the DHCP server may initiate a clocking mechanism upon the assigning of the IP addresses to start the clock for charging the customer. When the IP address is released tolling of the charge ceases with a time based stamping attributed to the IP assignment.

Figure 8:
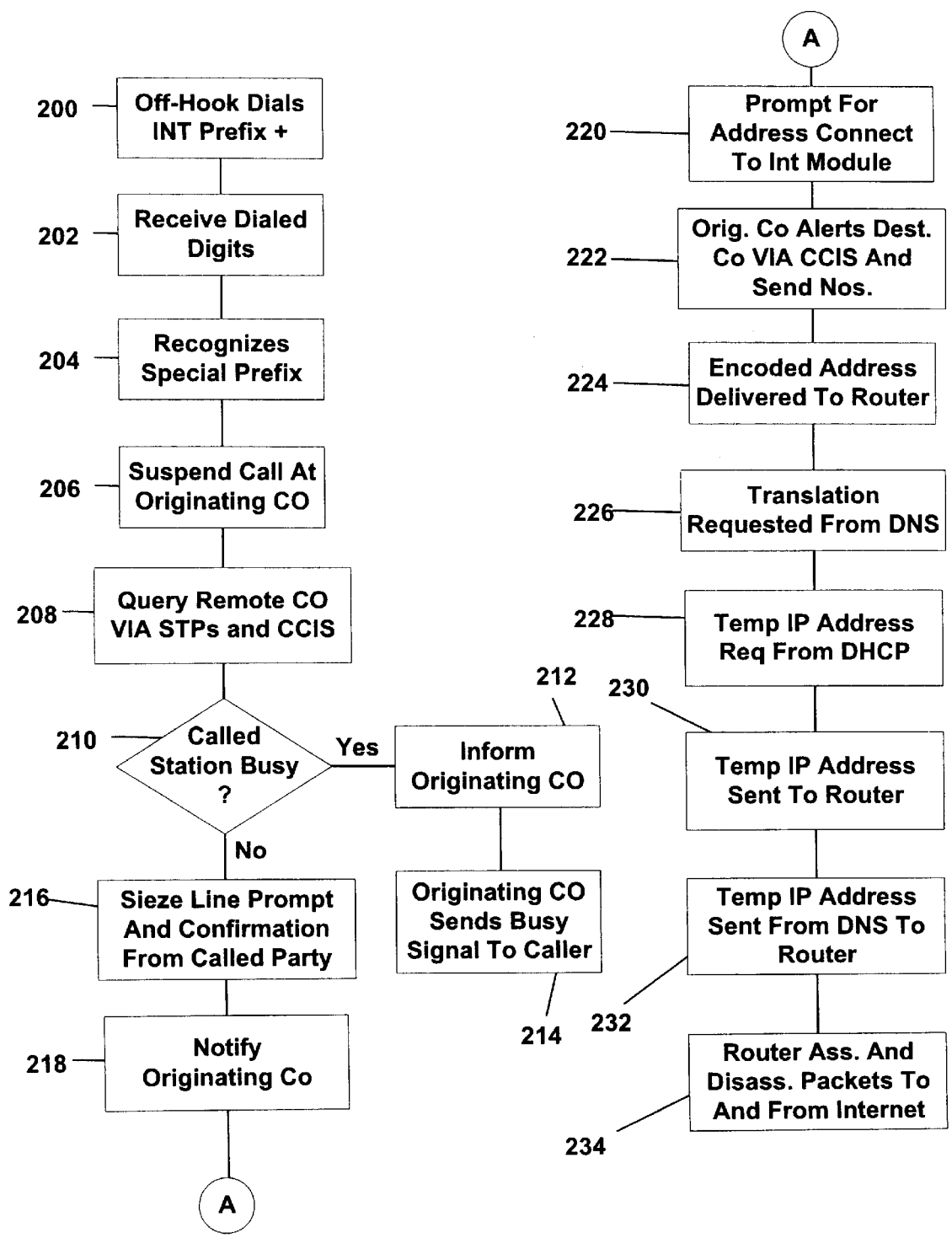
FIG. 8 illustrates another mode of operation of the system of FIG. 4 in simplified flow diagram form.

Another mode of operation of the system of FIG. 4 is now described in relation to the simplified flow diagram of FIG. 8. A customer using the POTS station at 56 as an originating station desires a voice connection to a called party on the premises of the POTS station 58. The calling party is aware that the proposed called party has at those premises a personal computer with voice capabilities and has knowledge of the Internet domain or hostname address of the proposed called party.

The Telco offering the service of the invention has established a prefix *82 for a telephone to telephone call as has been described in the previously discussed example. In this embodiment the Telco also establishes a second prefix *83 for voice communication from telephone to a voice capable computer possessing an Internet address. The communication establishment is here commenced by the calling party going off-hook and dialing the prefix *83 at 200.

At 202 the central office switching system at the originating central office responds to an off-hook and receives the dialed digits from the calling station. At 204 the central office switching system analyzes the received digits and determines from the prefix *83 that the call is an Internet call from a telephone station caller to a computer terminal at the customer premises of the called party. Responsive to its programming the originating office switching system knows that the call must be completed through a remote central office and that further processing is necessary. At 206 the local or originating central office suspends the call and at 208 sends a CCIS query message through one or more of the STPs.

The query message goes to the central office to which the called station is connected as determined by the called directory number that was dialed by the caller. The receiving or destination central office receives the query and determines at 210 whether or not the local loop to the premises of the station at 58 is busy. If the called local loop is busy, the receiving central office so informs the originating central office at 212. At 214 the originating central office provides a busy signal to the calling station.

If the called local loop is not busy, the receiving central office seizes the line. Upon the line going off hook the destination central office delivers a voice prompt to the responding party to activate the CPE computer to accept an Internet voice call. The central office also prompts the responding party to confirm that this has been accomplished. This is shown at step 216. A distinctive ring may be used in lieu of the prompt or together with the prompt to alert the receiving party that a telephone call is arriving via the Internet and that it will be handled by microphone and speaker associated with the sound card in the called party's computer.

The receiving or destination central office then informs the originating central office that the called line is available and that the computer is waiting at 218. As an alternative to this procedure the destination central office may alert the called computer by applying an alert signal between the tones of the ringing signal.

The originating central office issues a voice prompt to the calling party requesting that party to spell out the domain or hostname of the called party and immediately completes the trunk connection from the originating central office to the originating Internet Module. This step is shown in FIG. 8 at 220. Simultaneously the originating central office alerts the originating Internet Module that a domain or hostname call has been initiated and sends the directory numbers of the calling and called party. This parallel step is indicated at 222.

Figure 9:
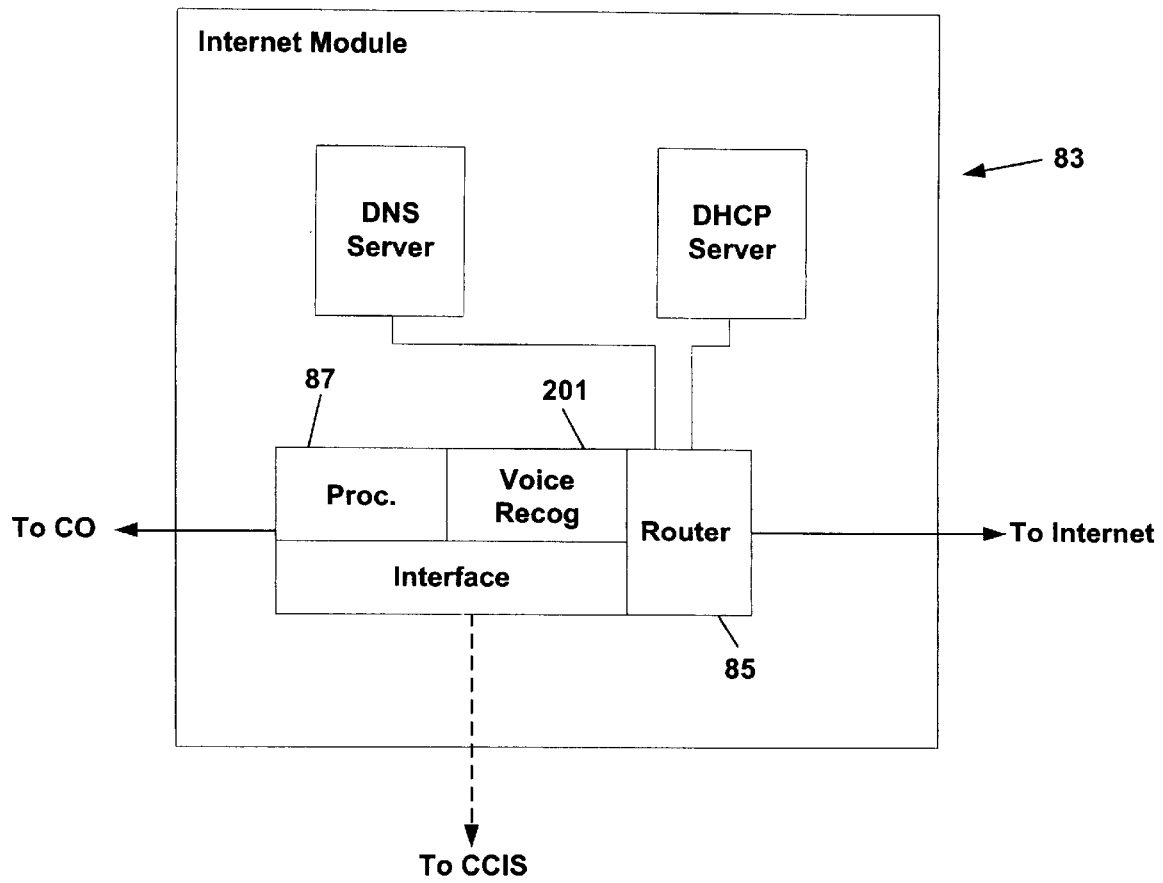
FIG. 9 illustrates in block diagram form another embodiment of an Internet Module for use in the invention.

In this embodiment of the invention the Internet Module is provided with a processor interface to the router which includes a voice recognition card to translate the incoming address to a TCP/IP format signal. An Internet Module of this type is illustrated in FIG. 9 where the voice card is shown at 201. The arriving address signal is delivered by the voice card and processor interface to the router 85. This step is shown at 224 in FIG. 8.

The router requests a domain name translation from the DNS server 89. This is indicated at step 226. At substantially the same time the router broadcasts a request for a temporary IP address for the calling directory number. This is indicated at step 228. The DHCP server provides the caller with a temporary IP address from the pool of addresses supplied by the Internet Service Provider which in this case is the Telco. The DHCP server selects an address from the pool and sends the address to the router at 230.

The Domain Name Service (DNS) server provides the translation from the domain or host name supplied by the caller into an IP address. Since each site maintains its own server no single site on the Internet is in possession of all of the translation data. The overall data constitutes a distributed database and relies on the servers at the individual sites. Access to the DNS is through a resolver and software library functions. The function in this case takes a domain name or hostname and returns an IP address. The functionality also is capable of providing the inverse function of taking an IP address and returning a hostname.

The IP address is sent by the DNS server to the router for incorporation into the packets to be assembled and dispatched onto the Internet. This step is shown at step 232. The router and its processor interface again serve a PAD function and transmit and receive TCP/IP packets to the Internet. This is indicated at 234.

In this embodiment of the invention the originating Internet Module and its processor interfaced router perform the functions of signal compression and expansion as well as packet assembly and disassembly (PAD). Thus the incoming DS0 signals from the originating central office are compressed from the 64 kbs DS0 rate to a 28.8 kbs modem rate assembled into TCP/IP protocol. The TCP/IP signals are transmitted via the Internet to the destination Internet Module 74. In this case the destination Internet Module may deliver the incoming TCP/IP signal direct to the computer modem 66. The voice communication may continue between the caller using the telephone station at 56 and the called party using the called computer at 62.

Figure 10:
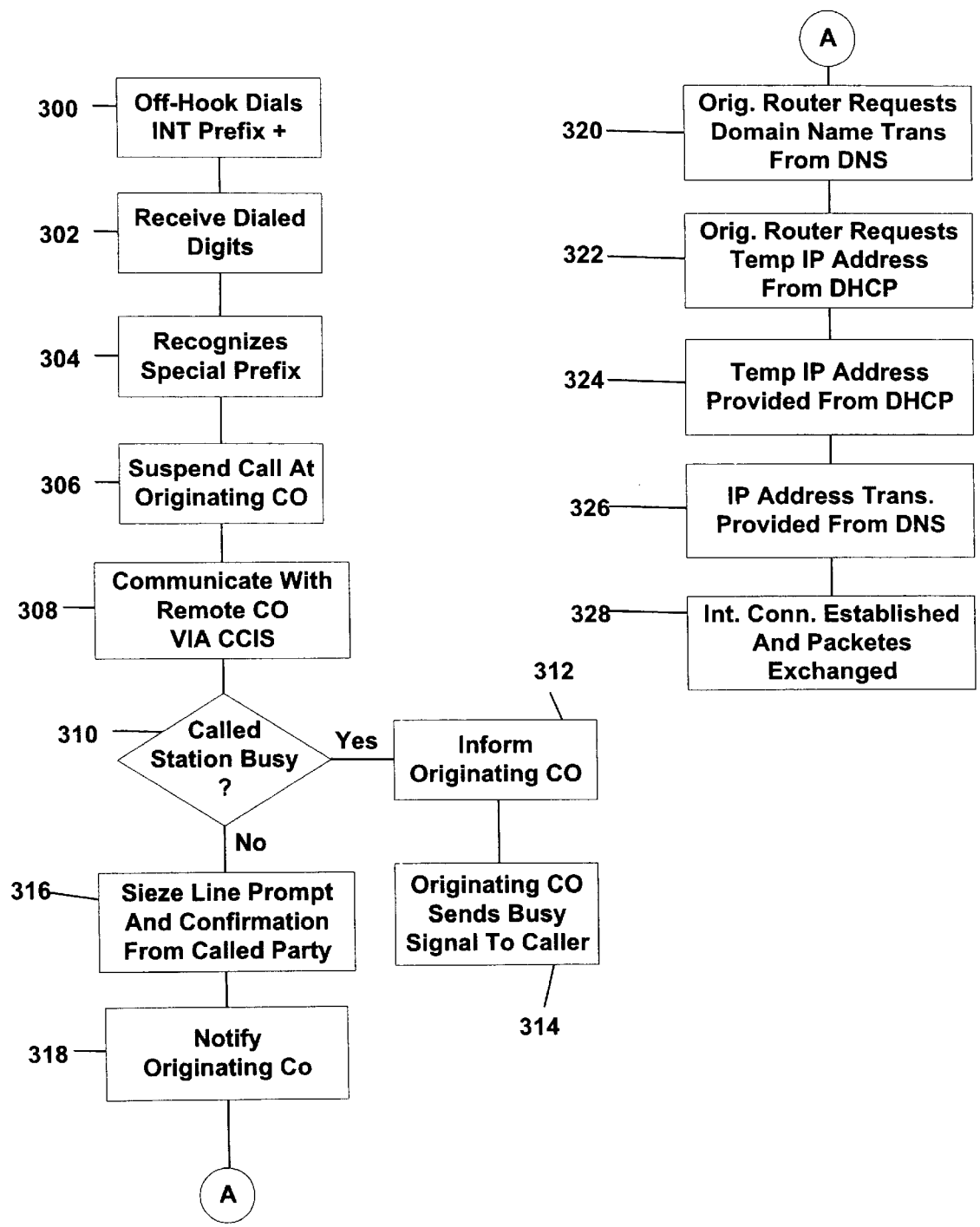
FIG. 10 shows a still further mode of operation of the system of the invention in simplified flow diagram form.

A still further mode of operation of the system of the invention is now described in relation to the simplified flow diagram of FIG. 10. According to this mode a voice connection may be established between a calling computer which may not have Internet access or an Internet address.

At 300 in FIG. 10 the calling PC 60 having voice functionality auto-dials the designated prefix which in this case may be *64. In addition to the prefix the computer dials the directory number of the called party and the domain or hostname of the called CPE computer. At 302 the central office switching system at the originating central office responds to the off-hook and receives the dialed digits from the calling station. At 304 the central office switching system analyzes the received digits and determines from the prefix *84 that the call is an Internet call from a computer station caller to a computer terminal at the customer premises of the called party. Responsive to its programming the originating office switching system knows that the call must be completed from a local computer through a remote central office and that further processing is necessary. At 306 the local or originating central office suspends the call and at 308 sends a CCIS query message through one or more of the STPs.

The query message goes to the central office to which the called station is connected as determined by the called directory number that was dialed by the caller. The receiving or destination central office receives the query and determines at 310 whether or not the local loop to the premises of the computer 62 is busy. If the called local loop is busy, the receiving central office so informs the originating central office at 312. At 314 the originating central office provides a busy signal to the calling station.

If the called local loop is not busy, the receiving central office seizes the line. Upon the line going off hook the destination central office delivers a voice prompt to the responding party to activate the CPE computer to accept an Internet voice call. The central office also prompts the responding party to confirm that this has been accomplished. The trunk connection from the destination central office to the destination Internet Module is completed. This is shown at step 316.

A distinctive ring may be used in lieu of the prompt or together with the prompt to alert the receiving party that a telephone call is arriving via the Internet and that it will be handled by microphone and speaker associated with the sound card in the called party's computer. As a still further alternative the destination central office may send a wake-up or alerting signal to the called computer between the ringing signals. The receiving or destination central office then informs the originating central office that the called line is available and that the computer is waiting at 318.

The router at the originating Internet Module requests a domain name translation from the DNS server 89. This is indicated at step 320. At substantially the same time the router broadcasts a request for a temporary IP address for the calling directory number. This is indicated at step 322. The DHCP server provides the caller with a temporary IP address from the pool of addresses supplied by the Internet Service Provider which in this case is the Telco. The DHCP server selects an address from the pool and sends the address to the router at 324.

The Domain Name Service (DNS) server provides the translation from the domain or host name supplied by the caller into an IP address. This IP address is supplied to the router and its associated processor interface at 326. The router is now in possession of the necessary information to perform it PAD function upon the data received from and delivered to the calling computer 60. The Internet connection or virtual connection is established at 328 and the voice communication from computer to computer may proceed.

While this illustration of computer to computer voice connection involved a calling computer without an Internet address and a called computer with an Internet address it will be obvious to those skilled in the art that the described methodology is also applicable to set ups where neither party has an Internet address as was the case with the telephone to telephone Internet connection.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of communicating via plural communication networks comprising:
    a switched telecommunications network having interconnected central office switching systems and having subscriber lines connected to said central office switching systems providing connection between terminals connected to said subscriber lines, each of said central office switching systems responding to a service request on a subscriber line connected thereto to selectively provide a communication connection between the requesting line and another selected subscriber line through the connected central office switching system or through the connected central office switching system and at least one other central office switching system;
    a separate control network for said switched telecommunications network comprising a common channel interoffice signaling network including signal transfer points connected to said central office switching systems through signal switching points via links between said signal switching points and signal transfer points;
    a global information system termed Internet that is logically linked together by a globally unique address space based on the Internet Protocol (IP);

said method comprising the steps of:
    responsive to a request from a first subscriber line connected to a first of said central office switching systems to establish voice communication through the Internet with a second subscriber line connected to a second of said central office switching systems, signaling through said control network to establish that said second subscriber line is not busy;
    upon establishing that said second subscriber line is not busy, holding said second subscriber line and signaling through said control network to notify said first of said central office switching systems that said second subscriber line is available and that a processor is associated with said second of said central office switching systems;
    obtaining a globally unique Internet address for a processor associated with at least one of said central office switching systems;
    using said address to establish a virtual connection through the Internet from said first of said central office switching systems to said second of said central office switching systems; and
    conducting a voice communication through said first subscriber line through the Internet and through said second subscriber line.

2. A method according to claim 1 including the steps of obtaining an Internet address for said processor associated with said second of said central office switching systems and signaling said address through said control network to said second of said central office switching systems, and using said address in establishing said virtual connection through said internetwork from said first of said central office switching systems to said second of said central office switching systems.

3. A method according to claim 2 wherein said processor associated with said second of said central office switching systems is connected to said second subscriber line as customer premises equipment.

4. A method according to claim 1 wherein said request is made with a telephone station connected to said first subscriber line.

5. A method according to claim 1 wherein said request is made with a processor connected to said first subscriber line.

6. A method according to claim 5 wherein said processor is the processor for which said address is obtained.

7. A method according to claim 1 wherein the establishment of said voice communication includes the steps of:
    transmitting an analog voice signal over said first subscriber line to said first of said central office switching systems;
    converting said analog voice signal to a first digital voice signal in said one of said central office switching systems;
    converting said first digital voice signal to a second packetized digital voice signal; and
    delivering said second packetized digital voice signal to the Internet in TCP/IP format.

8. A method according to claim 7 wherein the establishment of said voice communication includes the steps of:
    receiving said second packetized digital voice signal from the Internet in TCP/IP format;
    converting said second packetized digital voice signal from the Internet in TCP/IP format to a third digital voice signal and delivering said third digital voice signal to said second of said central office switching systems;

converting said third digital voice signal to an analog voice signal and delivering said analog voice signal from said second of said central office switching systems to said second subscriber line.

9. A method according to claim 8 wherein said first and third digital voice signals are in DS0 format.

10. A communications network comprising:

a switched telecommunications network having interconnected central office switching systems and having subscriber lines connected to said central office switching systems providing connection between terminals connected to said subscriber lines, each of said central office switching systems responding to a service request on a subscriber line connected thereto to selectively provide a communication connection between the requesting line and another selected subscriber line through the connected central office switching system or through the connected central office switching system and at least one other central office switching system;

a separate control network for said switched telecommunications network comprising a common channel interoffice signaling network including signal transfer points connected to said central office switching systems through signal switching points via links between said signal switching points and signal transfer points;

a global information system termed Internet that is logically linked together by a globally unique address space based on the Internet Protocol (IP);

at least a pair of said central office switching systems having connected thereto an Internet module, said central office switching systems providing selective connection between said modules and the subscriber lines connected to each of said pair of switching systems;

each of said Internet modules having associated therewith a domain name service server and a dynamic host configuration protocol server and a processor having router and packet assembler and disassembler capabilities;

said Internet modules being linked to signal transfer points in said control network whereby in response to control signals a virtual connection is established from a customer premises terminal connected to one of said subscriber lines through the central office switching system connected to one of said Internet modules through said Internet module through the Internet to the other of said Internet modules through the switching system connected to said other Internet module through a subscriber line connected to said switching system connected to said other Internet module to a customer premises terminal connected to said subscriber line connected to said last named switching system to provide voice communication between said customer premises.

11. A communications network comprising:

a switched telecommunications network having interconnected central office switching systems and having subscriber lines connected to said central office switching systems providing connection between terminals connected to said subscriber lines, each of said central office switching systems responding to a service request on a subscriber line connected thereto to selectively provide a communication connection between the requesting line and another selected subscriber line through the connected central office switching system or through the connected central office switching system and at least one other central office switching system;

a separate control network for said switched telecommunications network comprising a common channel interoffice signaling network including signal transfer points connected to said central office switching systems through signal switching points via links between said signal switching points and signal transfer points;

a global information system termed Internet that is logically linked together by a globally unique address space based on the Internet Protocol (IP);

at least a pair of said central office switching systems having connected thereto an Internet module, said central office switching systems providing selective connection between said modules and the subscriber lines connected to each of said pair of switching systems;

each of said Internet modules including a processor;

said Internet modules being linked to signal transfer points in said control network whereby in response to control signals a virtual connection is established from a customer premises terminal connected to one of said subscriber lines through the central office switching system connected to one of said Internet modules through said Internet module through the Internet to the other of said Internet modules through the switching system connected to said other Internet module through a subscriber line connected said switching system connected to said other Internet module to a customer premises terminal connected to said subscriber line connected to said last named switching system to provide voice communication between said customer premises.

12. A communications network according to claim 11 wherein said customer premises terminals are telephone stations.

13. A communications network according to claim 11 wherein said customer premises terminals are computers.

14. A communications network according to claim 11 wherein said Internet modules provide domain name translations and provide temporary Internet addresses used in establishing said virtual connection.

15. A communications network according to claim 11 wherein at least one of said Internet modules provides conversion of a digital signal at a first bps rate from the central office switching system connected to that Internet module to packets at a lower bps rate in TCP/IP format which are transmitted through the Internet.

16. A communications network according to claim 15 wherein the other of said Internet modules provides conversion of packets at said lower bps rate in TCP/IP format received from the Internet to a digital signal at a higher bps rate which are transmitted to said central office switching system connected to that Internet module.

17. A communications network comprising:

a switched telecommunications network having interconnected central office switching systems and having subscriber lines connected to said central office switching systems providing connection between terminals connected to said subscriber lines, each of said central office switching systems responding to a service request on a subscriber line connected thereto to selectively provide a communication connection between the requesting line and another selected subscriber line through the connected central office switching system or through the connected central office switching system and at least one other central office switching system;

a separate control network for said switched telecommunications network comprising a common channel interoffice signaling network including signal transfer points connected to said central office switching systems through signal switching points via links between said signal switching points and signal transfer points;

a global information system termed Internet that is logically linked together by a globally unique address space based on the Internet Protocol (IP);

at least a pair of said central office switching systems having connected thereto an Internet module, said central office switching systems providing selective connection between said modules and the subscriber lines connected to each of said pair of central office switching systems;

each of said Internet modules including a processor;

said Internet modules being linked to signal transfer points in said control network;

connections between said customer premise terminals connected to subscriber lines and their respective central office switching systems being established responsive to signals via said control network whereby a virtual connection is established from a customer premises terminal connected to one of said subscriber lines through the central office switching system connected to one of said Internet modules through said Internet module through the Internet to the other of said Internet modules through the central office switching system connected to said other Internet module through a subscriber line connected to said central office switching system connected to said other Internet module and to a customer premises terminal connected to said subscriber line connected to said last named central office switching system to provide voice communication between said customer premises.

18. A communications network according to claim 17 wherein said customer premises terminals are telephone stations.

19. A communications network according to claim 17 wherein said customer premises terminals are computers.

20. A communications network according to claim 17 wherein said Internet modules provide domain name translations and provide temporary Internet addresses used in establishing said virtual connection.

21. A communications network according to claim 17 wherein at least one of said Internet modules provides conversion of a digital signal at a first bps rate from the central office switching system connected to that Internet module to packets at a lower bps rate in TCP/IP format which are transmitted through the Internet.

22. A communications network according to claim 21 wherein the other of said Internet modules provides conversion of packets at said lower bps rate in TCP/IP format received from the Internet to a digital signal at a higher bps rate which is transmitted to said central office switching system connected to that Internet module.

* * * * *